United States Patent
Happonen et al.

(10) Patent No.: US 8,971,973 B2
(45) Date of Patent: Mar. 3, 2015

(54) HANDLING USER INPUTS

(75) Inventors: Aki Petri Happonen, Kiiminki (FI); Hannu Vilpponen, Jarvenpaa (FI); Henrik Stefan Markus Hakala, Tampere (FI); Matti Aleksi Malmstedt, Tampere (FI)

(73) Assignee: Nokia Corporation, Espoo (FI)

( * ) Notice: Subject to any disclaimer, the term of this patent is extended or adjusted under 35 U.S.C. 154(b) by 747 days.

(21) Appl. No.: 12/790,205

(22) Filed: May 28, 2010

(65) Prior Publication Data

US 2011/0294555 A1    Dec. 1, 2011

(51) Int. Cl.
*H04M 1/00*    (2006.01)
*G06F 1/16*    (2006.01)
*G06F 3/01*    (2006.01)
(Continued)

(52) U.S. Cl.
CPC ............ *G06F 1/1677* (2013.01); *G06F 1/1643* (2013.01); *G06F 3/011* (2013.01); *H04M 1/0235* (2013.01); *H04M 1/0245* (2013.01); *H04M 1/72552* (2013.01); *H04M 2250/22* (2013.01)
USPC ........ 455/575.4; 370/328; 370/331; 715/821; 715/206; 715/780

(58) Field of Classification Search
CPC . G06F 3/0488; G06F 3/04883; G06F 3/0482; G06F 3/04808; G06F 1/1624; G06F 3/04845; G06F 3/04886; G06F 2203/04104; G06F 2203/04808; G06F 1/1616; G06F 3/048; H04M 2250/22; H04M 1/576; H04M 1/72583; H04M 1/274525; H04M 1/72572; H04L 41/22; H04L 67/1095; H04L 67/2828; H04L 51/046; H04L 12/2818; G09G 2370/16; G09G 2354/00; G09G 2370/20; G09G 5/14

USPC ........ 455/575.4; 370/328, 332; 715/206, 780, 715/821
See application file for complete search history.

(56) References Cited

U.S. PATENT DOCUMENTS

| | | | |
|---|---|---|---|
| 6,445,932 B1 * | 9/2002 | Soini et al. ................. | 455/556.1 |
| 7,522,944 B2 * | 4/2009 | Hyun et al. ................. | 455/575.1 |
| 7,729,492 B2 * | 6/2010 | Demuynck et al. ...... | 379/433.11 |

(Continued)

FOREIGN PATENT DOCUMENTS

| | | |
|---|---|---|
| EP | 1 758 345 A1 | 2/2007 |
| EP | 2 020 807 A1 | 2/2009 |

(Continued)

OTHER PUBLICATIONS

International Search Report for Application No. PCT/Fi2011/050485 dated Aug. 12, 2011.

(Continued)

*Primary Examiner* — Nimesh Patel
(74) *Attorney, Agent, or Firm* — Alston & Bird LLP

(57) ABSTRACT

A device includes a device body comprising a user input interface for receiving user inputs, a member slidably engaged with the device body and slidable from a first position to a second position, and at least one processor configured, under the control of machine-readable code to detect incidences of user inputs via the user input interface, to detect the sliding of the member from the first position to the second position, and to be responsive to detecting a composite user input comprising a sliding of the member from the first position to the second position while a user input is incident via the user input interface to cause a first operation to be performed.

17 Claims, 7 Drawing Sheets

(51) Int. Cl.
*H04M 1/02* (2006.01)
*H04M 1/725* (2006.01)

(56) References Cited

U.S. PATENT DOCUMENTS

| | | | |
|---|---|---|---|
| 2003/0058255 A1* | 3/2003 | Yamagishi | 345/619 |
| 2003/0186708 A1* | 10/2003 | Parulski et al. | 455/456.1 |
| 2005/0282597 A1* | 12/2005 | Park et al. | 455/575.4 |
| 2008/0039159 A1* | 2/2008 | Joo et al. | 455/575.4 |
| 2009/0179789 A1* | 7/2009 | Haughay et al. | 341/176 |
| 2010/0035659 A1 | 2/2010 | Lin et al. | |
| 2010/0100839 A1 | 4/2010 | Tseng et al. | |
| 2010/0251177 A1* | 9/2010 | Geppert et al. | 715/821 |
| 2010/0262928 A1* | 10/2010 | Abbott | 715/769 |
| 2010/0331062 A1 | 12/2010 | Christensen et al. | |

FOREIGN PATENT DOCUMENTS

| | | |
|---|---|---|
| KR | 100849293 B1 | 7/2008 |
| WO | WO 2010 048253 A1 | 4/2010 |

OTHER PUBLICATIONS

Office Action for Chinese Application No. 201180026644.2 date Oct. 14, 2014.

* cited by examiner

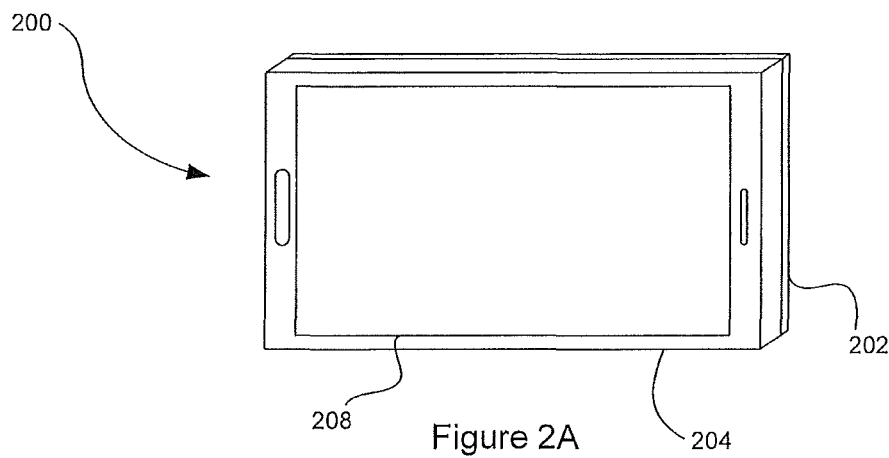
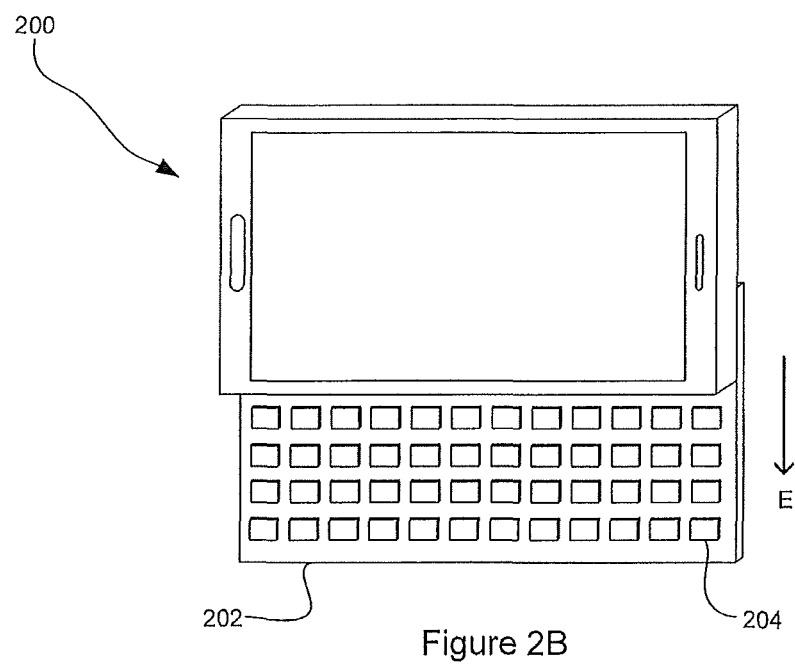

HANDLING USER INPUTS

BACKGROUND

The aspects of the disclosed embodiments relate to handling user inputs.

It is known for electronic devices to include movable members, or elements, which are slidably engaged with a main body of the electronic device. Examples of slidable members used in mobile phones include camera lens covers and slide out keyboards. It is known to detect movement of a slidable member between an open and a closed position and to use the detection in operation of the mobile phone.

The aspects of the disclosed embodiments were made within the context of the above-described, and similar, electronic devices.

SUMMARY

According to a first aspect, this specification describes a device comprising: a device body comprising a user input interface for receiving user inputs; a member slidably engaged with the device body and slidable from a first position to a second position; and at least one processor configured, under the control of machine-readable code: to detect incidences of user inputs via the user input interface; to detect the sliding of the member from the first position to the second position; and to be responsive to detecting a composite user input comprising a sliding of the member from the first position to the second position while a user input is incident via the user input interface to cause a first operation to be performed.

According to a second aspect, this specification describes an apparatus comprising: at least one processor configured, under the control of machine-readable code: to receive signals indicative of the incidence of a user input received via a user input interface; to receive a signal indicative of a slidable member slidably engaged with a device body having been moved from a first position to a second position; to be responsive to receipt of a signal indicative of the member having been moved from the first position to the second position while a user input is incident via the user input interface to cause a first operation to be performed.

According to a third aspect, this specification describes a method comprising: receiving signals indicative of incidences of user inputs via a user input interface of an electronic device comprising a device body, a member slidably engaged with the device body and slidable from a first position to a second position; receiving a signal indicative of the sliding of the member from the first position to the second position; and responding to detection of a composite user input comprising a sliding of the member from the first position to the second position while a user input is incident via the user input interface by causing a first operation to be performed.

According to a fourth aspect, this specification describes a non-transitory computer-readable storage medium having stored thereon computer-readable code, which, when executed by computing apparatus, causes the computer apparatus: to receive signals indicative of an incidence of user inputs via a user input interface of an electronic device comprising a device body, a member slidably engaged with the device body and slidable from a first position to a second position; to receive a signal indicative of the sliding of the member from the first position to the second position; and to respond to detection of a composite user input comprising a sliding of the member from the first position to the second position while a user input is incident via the user input interface by causing a first operation to be performed.

The specification also describes machine readable code, optionally stored on a non-transitory memory medium, which when executed by at least one processor, causes methods according to the third aspect to be performed.

BRIEF DESCRIPTION OF THE DRAWINGS

FIGS. 2A and 2B show a second example of an electronic device including a slidable member;

DETAILED DESCRIPTION

FIGS. 1 to 3 depict examples of electronic devices including slidable members.

Figure 1A:
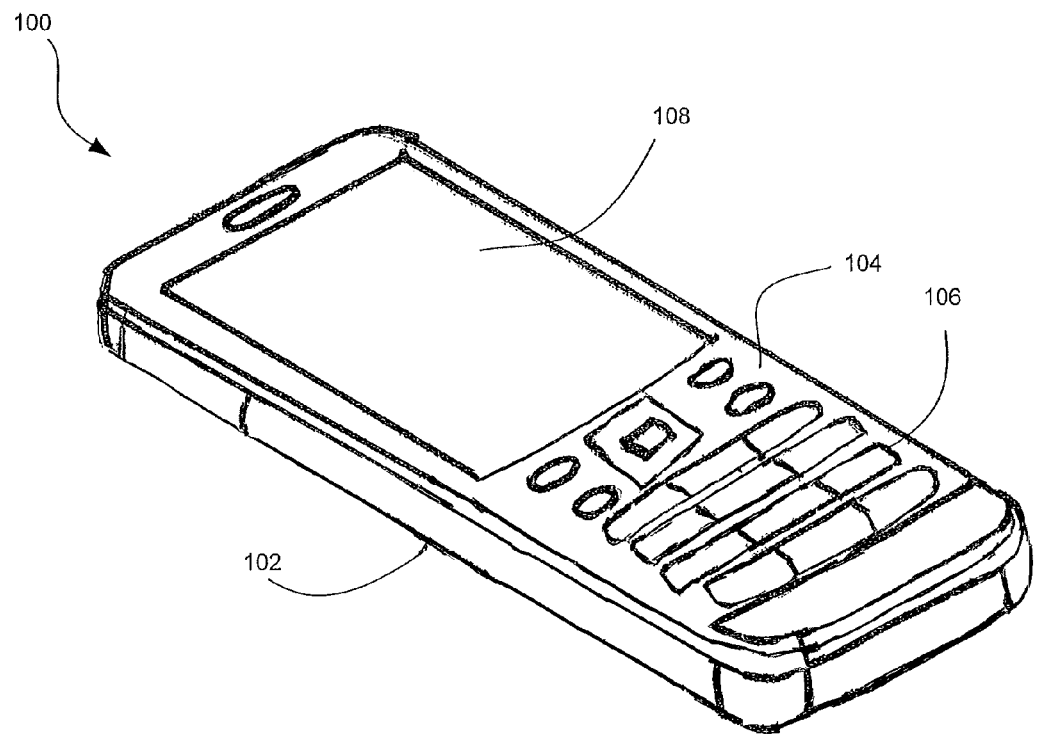
FIGS. 1A and 1B show a first example of an electronic device including a slidable member.
Figure 1B:
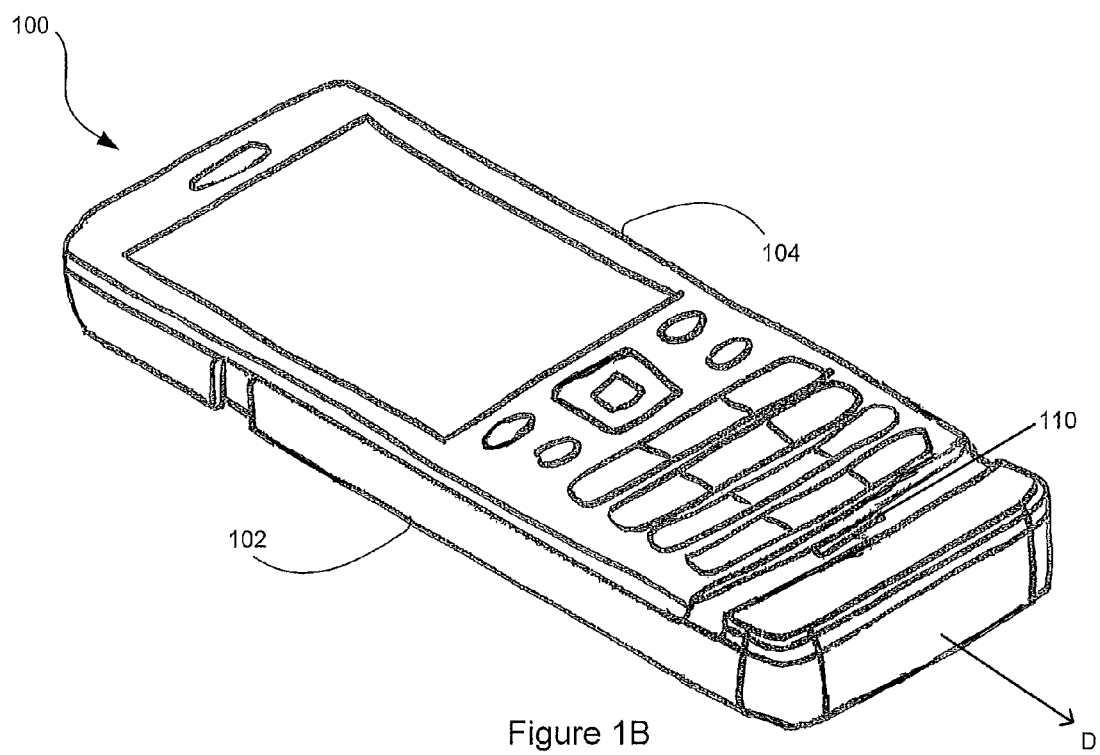

FIGS. 1A and 1B depict a mobile telephone 100 including a member 102 slidably engaged with the main body 104 of the telephone 100. In this example, the slidable member 102 is the back cover. A top surface of the main body 104 includes a user-input interface 106, in this example a keypad, and a display 108.

The back cover 102 is movable with respect to the main body 104. The back cover 102 is configured to move linearly in a longitudinal direction (denoted D in FIG. 1B) with respect to the main body 104. Thus, the member 104 is slidable between a closed position as shown in FIG. 1A and an open position as shown in FIG. 1B. Movement of the member 102 from the closed position to the open position causes a loudspeaker aperture 110, which is hidden when the member is in the closed position, to be revealed. Thus, a user of the telephone 100 may expose the loudspeaker aperture 110, thus boosting loudspeaker performance, by moving the member 102 from its closed position to its open position when they wish to use the loudspeaker (e.g. to play music or to use a "speakerphone" function).

FIGS. 2A and 2B depict a second example mobile telephone 200 having a member 202 which is slidable relative to a main body 204 of the telephone 200. In this example, the movable member 202 comprises a keypad 206. In a closed position, as shown in FIG. 2A, the moveable member 202, and thus also the keypad 206, resides behind the main body 204 of the telephone 200.

In the example of FIGS. 2A and 2B, the main body 204 includes a touchscreen display 208 with which the user can apply touch, or tactile, inputs to the mobile telephone 200. However, some users may prefer to input text inputs such as emails, text messages and the like, using the keypad 206 instead of the touchscreen display 208. When a user wishes to use the keypad 206, they move the slidable member 202 relative to the main body 204 in a direction denoted E from a closed position to an open position. Thereby the keypad 206 is slid out from behind the main body 200.

Figure 3A:
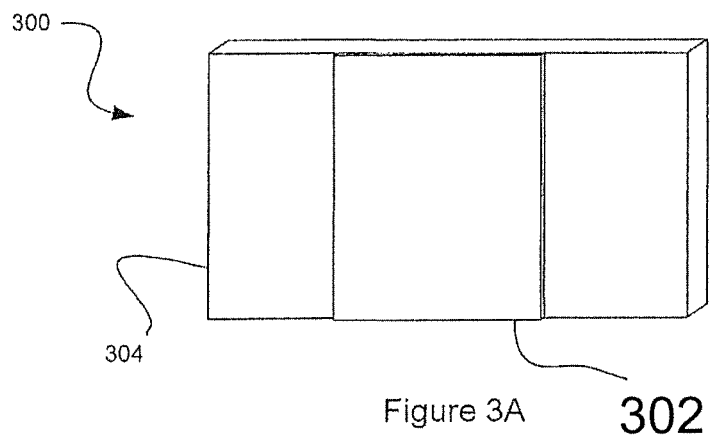
FIGS. 3A to 3C show a third example of an electronic device including a slidable member.
Figure 3B:
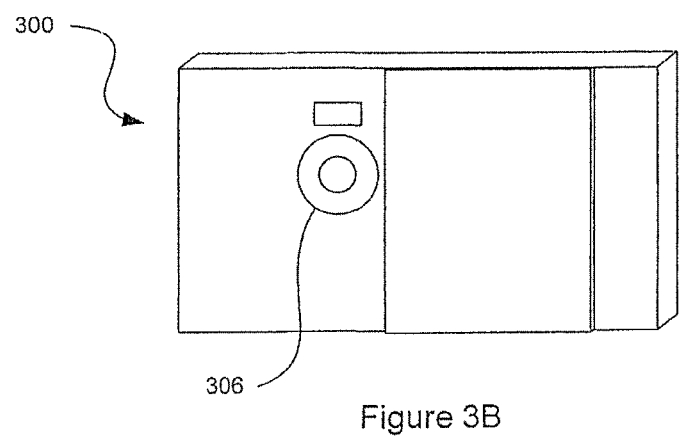
Figure 3C:
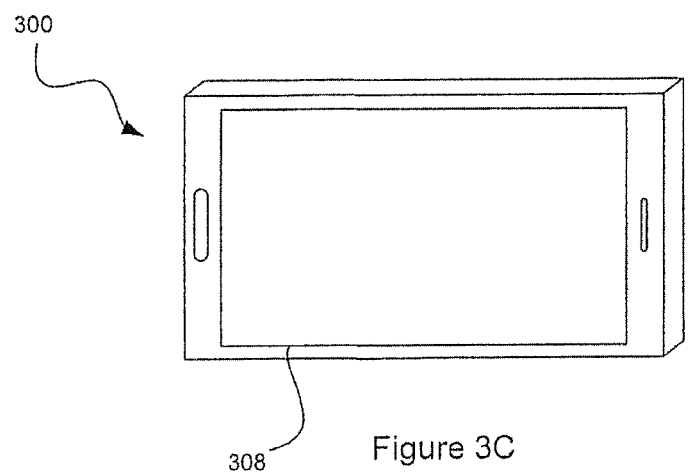

FIGS. 3A to 3C depict a third example electronic device 300, which is also mobile telephone. The mobile telephone 300 comprises a moveable member 302 that is slidable relative to a main body 304 of the telephone 300. In this example, the slidable member 302 is a cover for a camera lens 306. In its closed position, as shown in FIG. 3A, the cover 302 resides in front of the camera lens 306, thereby protecting the lens 306 from being dirtied or scratched etc. The cover 302 is slidable relative to the main body 304 of the telephone 300 to reveal the camera lens 306 and thereby to allow photographs to be taken or video captured. FIG. 3B shows the telephone with the member 302 in its open position, the camera lens 306 thus being exposed.

FIG. 3C shows a front surface of the main body 304 of the telephone 300. A touchscreen display 308 is provided on the front surface of the main body 304 of the telephone 300. The touchscreen display 308 is operable to display information to the user and to allow the user to provide inputs to the mobile telephone 300.

Additional example embodiments will now be described primarily with reference to the electronic device of FIGS. 2A and 2B. However, other embodiments utilise the electronic devices of FIGS. 1 and 3. Furthermore, other embodiments utilise any electronic device which includes a slidable member and a user input interface. Some of the embodiments disclosed herein may be implemented in portable, or handheld, electronic devices. Such portable electronic devices include mobile telephones, digital cameras, navigation modules, computers portable media players, and other such devices.

Figure 4:
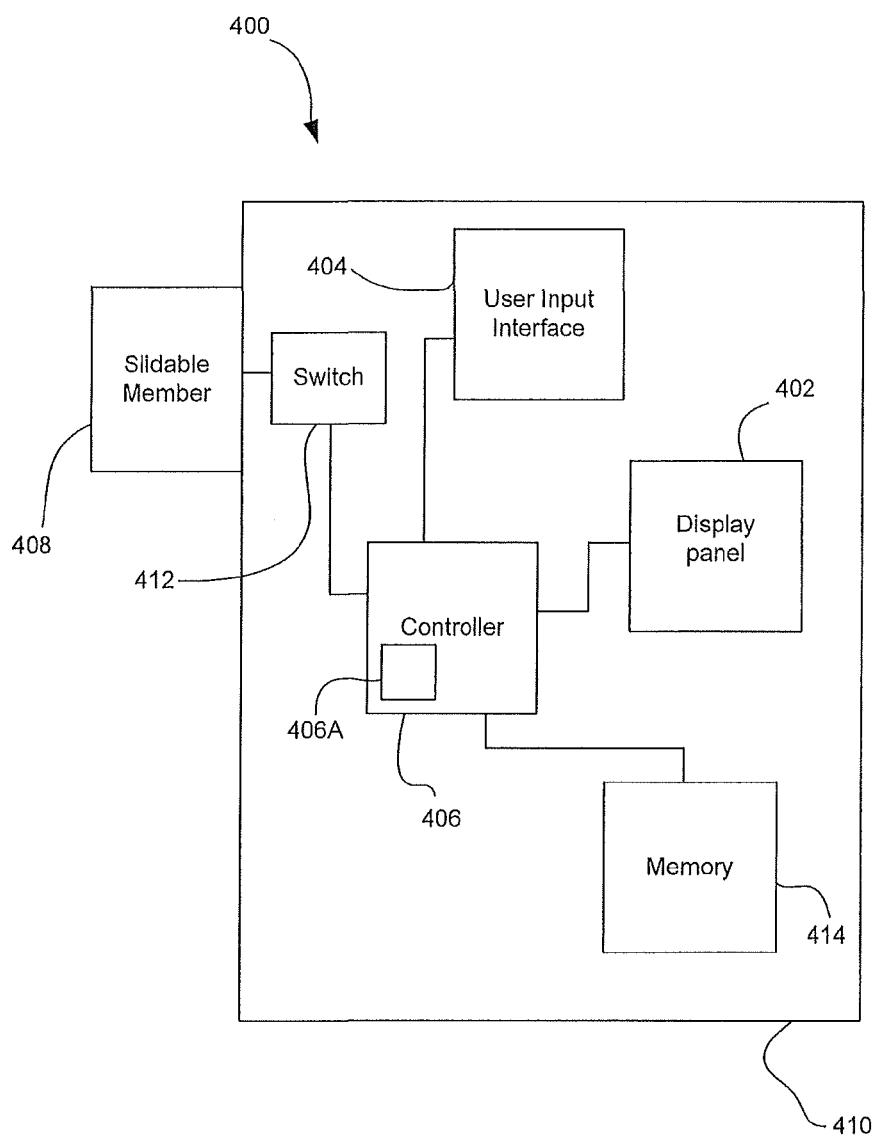
FIG. 4 is a schematic view of an electronic device according to example embodiments.

FIG. 4 is a schematic of an electronic device 400 according to additional example embodiments. The electronic device 400 may be, for example, the device 200 depicted in FIGS. 2A and 2B. The device 400 comprises a display panel 402, a user input interface 404, and a controller 406. The device 400 also comprises a slidable member 408 that is slidable relative to a main body 410 of the device. The device comprises a switch 412 which is configured such that movement of the slidable member 408 between a first position and a second position, and vice versa, is detected. In one example the first position may be a closed position and the second position may be an open position. The switch 412 may be a mechanical, electromechanical or purely electrical switch or may incorporate a transducer, for instance an optical sensor or a Hall effect sensor.

The controller 406 is operable to receive from the user input interface 404 signals indicative of inputs that are incident on the user input interface 404. The controller 406 is operable also to control the output of the display panel 402. The controller 406 is operable to receive signals from the switch 412. Based on the signals received from the switch 412, the controller 406 is operable to detect that the slidable member 408 has been or is being moved from its closed position to its open position or vice versa.

The controller 406 includes one or more processors 406A. The one or more processors 406A operate under the control of computer-readable instructions, particularly an operating system and additional software, middleware or firmware modules, and software applications. The operating system and software etc. are stored on a non-transitory memory medium 414 such as ROM. The controller 406 may also comprise one or more application specific integrated circuits (ASICs) (not shown).

The controller 406 is operable to execute software applications stored in the memory 414. The applications may include for example an email application, a media player application and a navigation application and a photo-gallery application.

In electronic devices such as that shown in FIGS. 3A to 3C, the user input interface 404 comprises a touch-sensitive transducer overlaid on the display panel 402 to form a touchscreen. However, the user input interface 404 may alternatively be a keypad 106 such as that shown in FIGS. 1A and 1B. According to some alternative embodiments, such as that shown in FIGS. 2A and 2B, the electronic device 400 may comprise both a touchscreen display 404, 402 and a keypad or keyboard. In such devices, user inputs may be provided to the device via both interfaces.

The electronic device may also comprise other components such as a camera (as does the device of FIGS. 3A to 3D) and a loudspeaker (as does the device of FIGS. 1A and 1B).

The electronic device 400 may also comprise other components (not shown). For example, the device 400 may comprise an antenna and transceiver circuitry for sending and receiving data, such as voice data. The device 400 may include a positioning receiver, such as a GPS receiver.

FIGS. 5A to 5D depict the electronic device 200 of FIG. 2 implementing still more example embodiments. It will thus be understood that the electronic device 200 of FIGS. 2A and 2B includes the components shown in the electronic device 400 of FIG. 4.

Figure 5B:
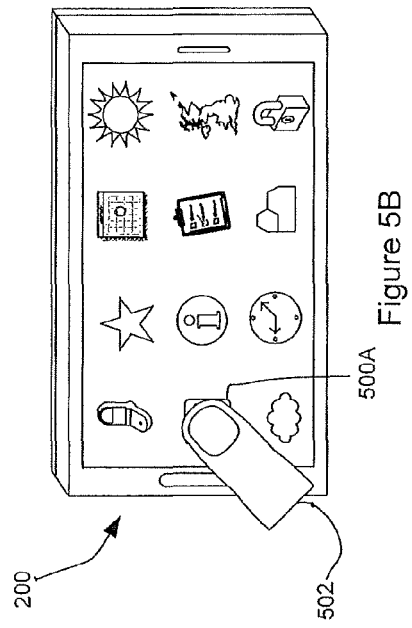
FIGS. 5A to 5D show the electronic device of FIG. 2 implementing additional example embodiments.
Figure 5D:
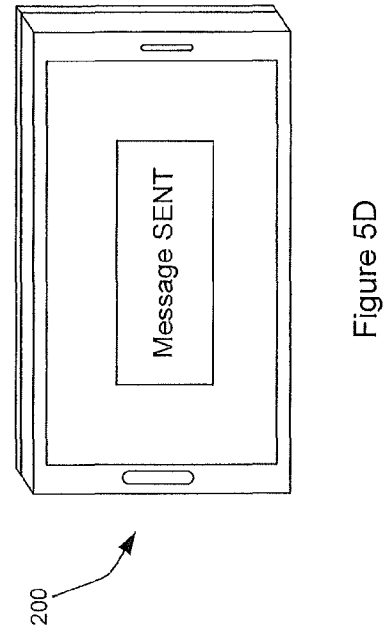
Figure 5A:
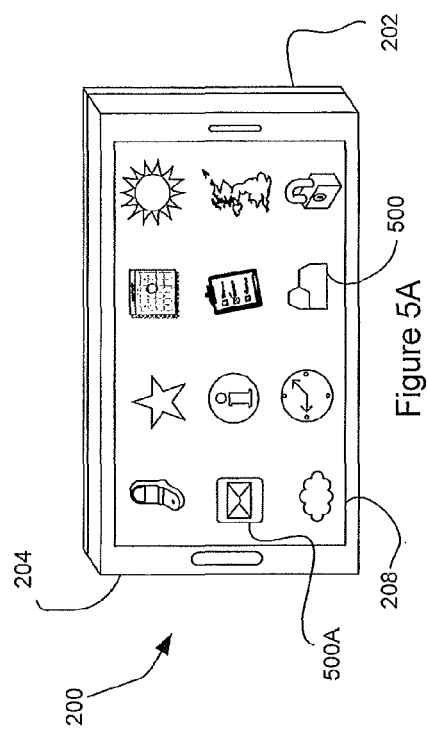

In FIG. 5A, the slidable member 202 is in its closed configuration. As such the keypad is hidden behind the main body 204 of the device 200.

Displayed on the touchscreen 208 is a plurality of selectable icons 500. Each selectable icon 500 may relate to an executable application. Thus, an application can be selected by applying a tactile, or touch, input to a region of the touchscreen 208 upon which the corresponding selectable icon 500 is displayed. As such, to select an email application, the user applies a tactile input to the touchscreen 208 by first placing their finger or thumb 502 on a region of the touchscreen 208 which corresponds to the email application icon 500A and subsequently removing their finger or thumb 502 from the surface of the touchscreen 208.

In FIG. 5B, the user is applying a touch input to the surface of a touchscreen at a position corresponding to the email application icon 500A.

In response to the user removing their finger or thumb from the touchscreen 208, the email application is opened (or executed). This causes the email application to display a menu including multiple selectable options such as "Inbox", "Sent items" etc.

Figure 5C:
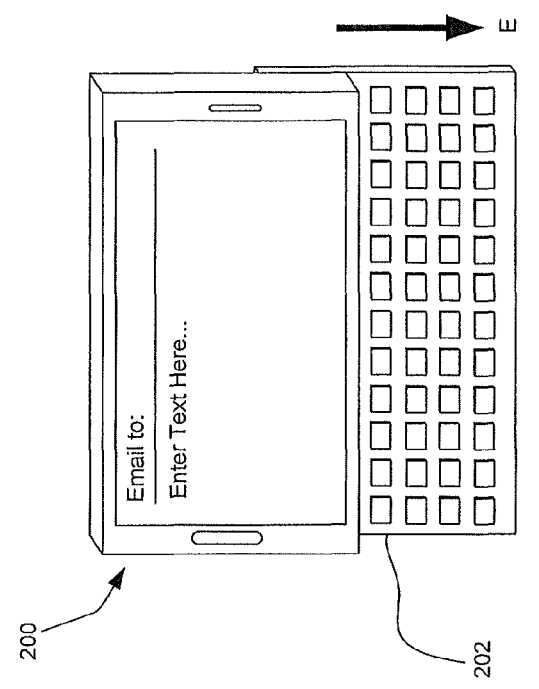

In another situation, a different combination of user inputs results in a different response. In particular, the device 200 starts again in FIG. 5B, in which the user is applying a touch input to the surface of a touchscreen at a position corresponding to the email application icon 500A. As shown in FIG. 5C, instead of removing their finger from the touchscreen, the user slides the slidable member 202 (in a direction denoted "E" in FIG. 5C) from its closed position to its open position to reveal the keypad 206. Sliding of the slidable member 202 from its closed position to its open position while the user input is being applied to the touchscreen 208 causes an action, or operation, which is different to that normally associated with the selection of a particular icon 500, to be performed. In this example, sliding of the slidable member 200 from a first position to a second position such as from closed to open, while providing a touch input to the email icon 500A causes a new email template (as is shown in FIG. 5C) to be presented to the user instead of the menu which would have been presented had the slidable member not been slid. This is achieved by the email application and/or the operating system being configured to respond to a composite input comprising the touchscreen input and the switch input by providing a different response to one of those inputs alone. Through these features, the user is able to proceed directly to writing a new email message instead of being required to navigate through the operating menu. This saves the user time and improves the overall usability of the electronic device. Additionally, it can result in less utilisation of the hardware of the device since a function can be provided with fewer user inputs. In turn this can improve the reliability and longevity of the device.

According to some embodiments, the subsequent movement of the slidable member to its closed position causes another action or operation to be performed. In the example depicted in FIGS. 5A to 5D, the subsequent sliding of the slidable member to its closed position may cause the email to be sent (as is shown in FIG. 5D) or alternatively to be cancelled.

It will be understood that this concept is advantageous in a number of different situations. For example, by suitable configuration of the operating system and/or a relevant software application a user can bypass an inbox or other menu and cause an SMS or MMS text input screen to be displayed immediately by sliding the moveable member 202 while a touch input is being applied to the applicable icon. Similarly, by suitable configuration of the operating system and/or a relevant software application, the user can control the device 200 to cause an email, SMS, or MMS input screen which is addressed to a particular contact to be immediately displayed. This may be achieved, for example, by sliding the moveable member 202 while applying a touch input to a particular contact listed on the display screen. Also, by suitable configuration of the operating system and/or a relevant software application, the concept allows a user efficiently to reply to or forward a particular email, SMS or MMS. To achieve this, the user can provide a touch input to the message which is to be forwarded or replied to and slides the slidable member 202. Other examples include, by suitable configuration of the operating system and/or a relevant software application, allowing the user to provide comments on particular parts of a text document such as a blog. In this example, the user selects the particular part of the blog upon which they would like to comment by applying a touch input to a location of the touchscreen 208 corresponding to that part. Prior to removing their finger or thumb, the user slides the moveable member 202 to cause a text input screen to be displayed. The concept can also be applied to web browser applications. Here, by suitable configuration of the operating system and/or a relevant software application, the sliding of the moveable member 202 while providing a touch input to a web browser icon may automatically open a text entry for a new web address or a search engine.

Provision of the slidable member 202 on the rear of the device 200 is particularly useful in that the user can slide the member 202 from open to closed or vice versa using their fingers, while at the same time maintaining their thumb in contact with the touchscreen 208. Thus, the user can operate the device 200 according to the example embodiments using just one hand.

Figure 6A:
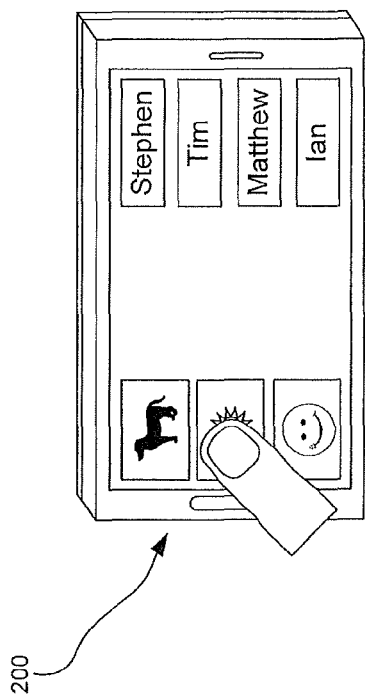
FIGS. 6A to 6D show the electronic device of FIG. 2 implementing other example embodiments.

FIGS. 6A to 6D depict an operation of the electronic device of FIG. 2 according to alternative example embodiments. In FIG. 6A, the slidable member 202 is in its closed position. Displayed on a left side of the touchscreen 208 are a number of icons 500. In this example, the icons 500 each represent a picture. However, according to alternative example embodiments, they could represent another form of data item, file or media object, for example, an audio clip, a video clip or a text document. Displayed on the right side of the touchscreen 208 is a list of contacts 502. The list may be compiled in any suitable manner. The contacts on the list may have been preselected by the user for display on the left side of the touchscreen 208.

Figure 6B:
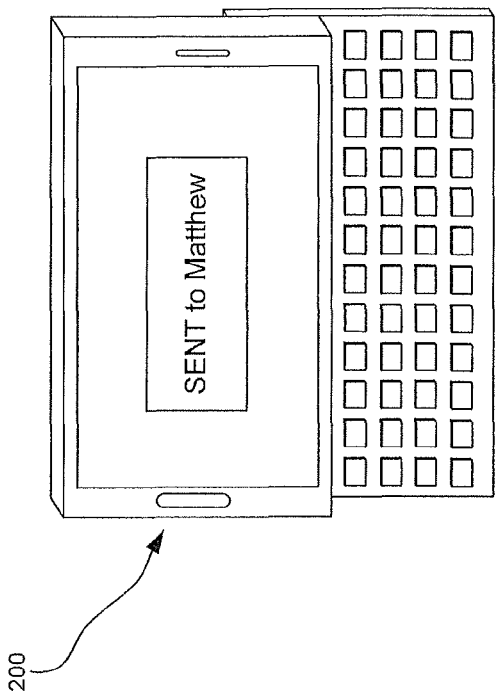
Figure 6C:
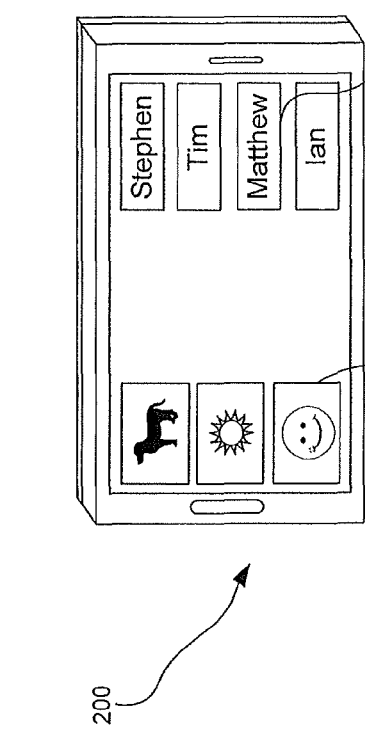

In FIG. 6B, the user selects a picture that they wish to send to one of their contacts. This is carried out by applying a touch input to the icon corresponding to the picture that is to be sent. Subsequently, without removing their thumb from the selected picture, the user selects from the list of contacts a contact to which the picture is to be sent. This is performed by providing a touch input to a region of the touchscreen 208 on which the contact is displayed. This is shown in FIG. 6C.

Figure 6D:
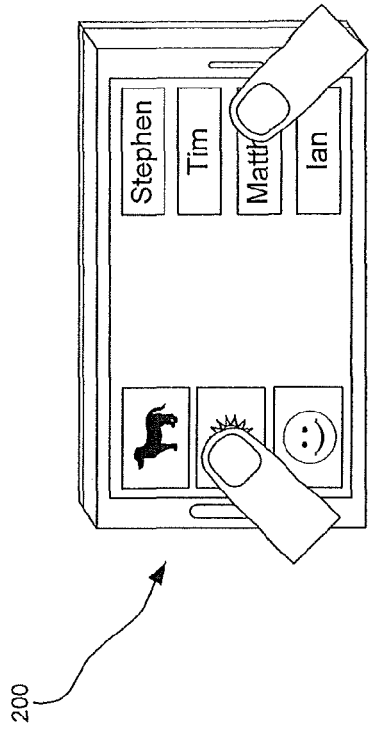

Next, while the two touch inputs are still incident on the touchscreen 208, the user slides the slidable member 202. This sliding of the slidable member 202 is detected by the controller 406, by suitable configuration of the operating system and/or a relevant software application, which causes the selected photograph to be sent to the selected contact. This is shown in FIG. 6D. In this way, the user is able easily to send photographs and other data objects (such as audio files, video clips etc.) to their contacts without needing to navigate complex menu systems. Generally, a user will apply two touch inputs to opposite sides of the touch screen using both thumbs. In such a situation, it is difficult for the user to apply a third input to the touchscreen in order to cause the object to be sent. Provision of the slidable member 202 on the rear of the device 200 is thus particularly useful in that the user can slide the member 202 from open to closed or vice versa using their fingers, while at the same time maintaining both thumbs in contact with the touchscreen 208.

According to some example embodiments, by suitable configuration of the operating system and/or a relevant software application, the list of contacts may not be displayed on the touchscreen until a touch input lasting more a predetermined period of time is incident on any one of the icons. Thus the user is operable to detect a touch input lasting longer than a predetermined period of time, and in response to cause the list of contacts to be displayed. When the contact list is displayed, the desired contact can be selected and the slidable member subsequently slid thereby to send the picture to the selected contact. In this way, a user whilst browsing their photo gallery and may send a particular photo, either displayed individually or in an array, to one of their contacts without the need to navigate any menus.

It will be understood that this concept may be advantageous in other scenarios. For example, a user may decide that they wish to send an email to a particular contact. By suitable configuration of the operating system and/or a relevant software application, the user can select an email icon from a menu by applying a touch input to the icon. By maintaining this touch input for a predetermined period of time, a list of contacts may appear at a location on the touchscreen. The user can then select the contact to whom they wish write the email by applying a second touch input to the selected contact. Subsequently, while maintaining both touch inputs, sliding the slidable member 202 causes a text input screen for an email addressed to the selected contact to be displayed. The user can subsequently use the keypad, which has been revealed by sliding of the moveable member 202, to write the email. When the email is complete they may return the moveable member to its closed position, thereby to send the email.

In all the above-described example embodiments, sliding of the slidable member, without simultaneous touch inputs, may cause an operation to be performed. For example, sliding of the cover of the device 300 of FIGS. 3A to 3C may cause a camera application to be launched. Similarly, sliding of the slidable member 102 of the device 100 of FIGS. 1A and 1B may cause an audio player application to be launched.

Further example embodiments will now be described with reference to the flow chart of FIG. 7.

In S1, the controller 406 determines whether a touch input is incident on the touchscreen 208. This determination may be based on signals received directly or indirectly from the touchscreen 208.

If, in S1, it is determined that a touch input is incident on the touchscreen 208, the method proceeds to S2. In S2, the controller 406 determines whether the touch input has finished (i.e. that the user's finger is no longer on or near the touch screen).

If, in S2, the touch input is determined not to have finished, the method proceeds to S3.

In S3, it is determined whether the slidable member 202 has been slid. This determination is based on signals received directly or indirectly from the switch 412. If, in S2, it is determined that the slidable member has been slid, the method proceeds to S4.

In S4, the controller 406 causes a first operation to be performed. The first operation is one that is associated with the receipt by the device of a composite input of the sliding of the slidable member 202 while a touch input is incident on the touchscreen 208. The first operation may be dependent on the icon to which the touch input is incident. In the example described with reference to FIGS. 5A to 5D, the first operation is the display of an email text input screen.

If, in S2, the touch input is determined to have finished, the method proceeds to S5. In S5, in response to detecting that a touch input has been applied to the touchscreen and that the slidable member was not slid before the touch input finished, the controller 406 causes a second operation to be performed. The second operation is an operation associated with the receipt of a touch input without the sliding of the slidable member 202. The nature of the second operation may depend on the nature of the icon selected by the touch input. For example, when the icon corresponds to a media object (as in the example described with reference to FIGS. 6A to 6D), the second operation may be to open or play the media object.

If, in S1, it is determined that a touch input is not incident on the touchscreen 208, the method proceeds to S6. In S6, the processor 406 determines if the slidable member has been actuated. This determination is based on signals received from directly or indirectly from the switch 412.

If, in S6, it is determined that the slidable member 202 has been actuated, the method proceeds to S7. In S7, the controller 406 causes a third operation to be performed. The third operation is an operation associated with the sliding of the slidable member 202, when a touch input is not incident on the touchscreen 208. The nature of the third operation may depend on a number of factors, just one of which is device type. For example, the sliding of the slidable member 302 of the device 300 of FIG. 3, when a touch input is not incident on the touchscreen 308, may cause a camera application to be launched.

If, in S6, it is determined that the slidable member has not been actuated, the operation returns to S1.

Figure 7:
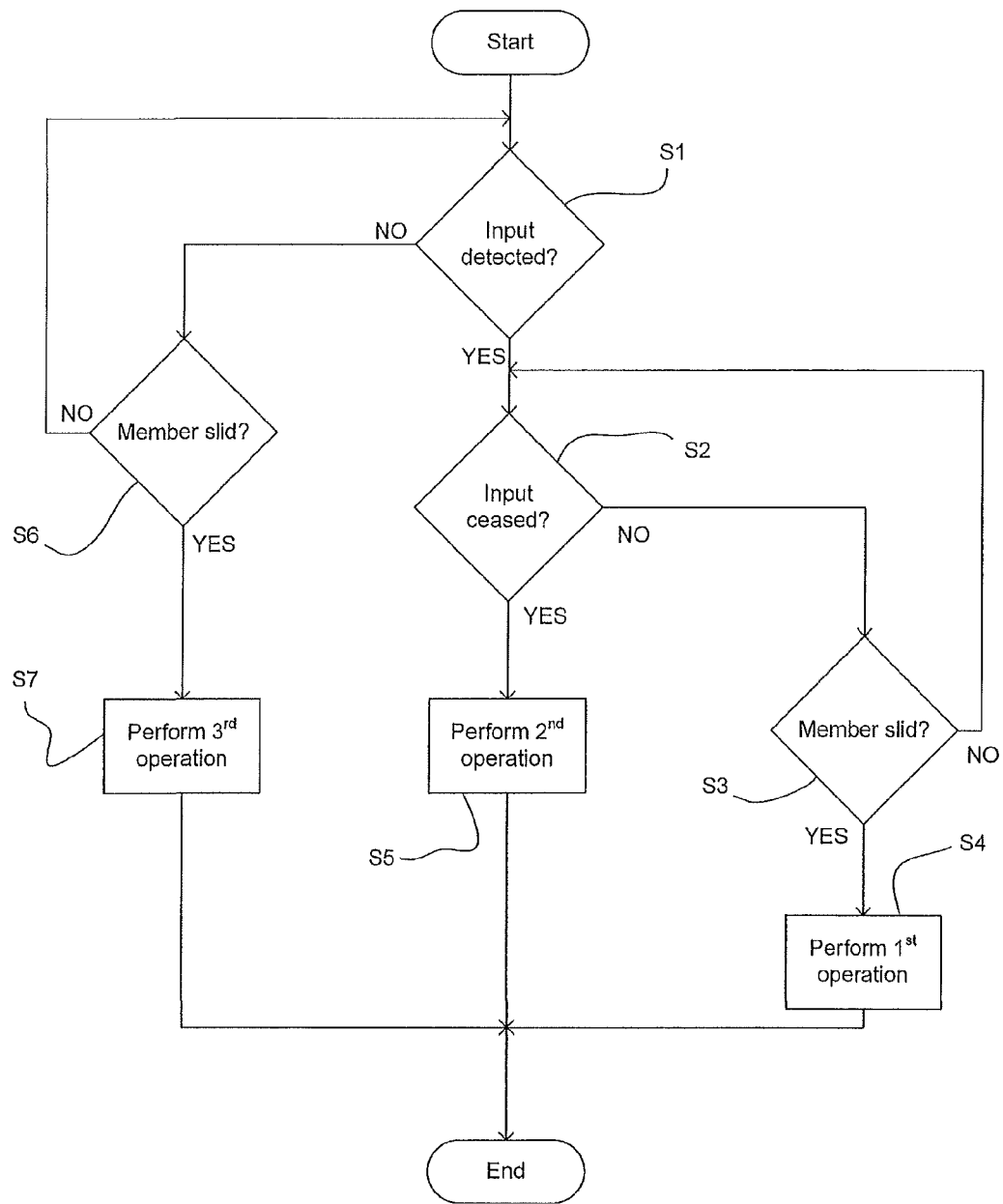
FIG. 7 is a flow diagram illustrating an operation according to the example embodiments disclosed herein.

It will be understood that the method described with reference to FIG. 7 is simplified for ease of understanding. For example, certain elements of the method in reality may be performed simultaneously. For example, the S1 and S6 may be performed simultaneously, such that the controller waits to receive signals indicative of an incident touch input or of the sliding of the slidable member and acts accordingly, depending on which is received. Similarly, S2 and S3 may be simultaneous.

The above-described example embodiments have been described with reference to the touchscreen device 200 depicted in FIGS. 2A and 2B. However, it will be understood that the concept can be implemented in any of the devices of FIGS. 1 to 3 or in any other electronic device having both a member slidably engaged with a main body of the device and a user input interface. In devices which do not include a touchscreen, such as the device of FIGS. 1A and 1B, the inputs may be provided using the keypad. As such, one of the keys of the keypad may be associated with a particular application, a simple press of the key causing the application to be launched. If, however, the slidable member 102 is actuated while the key is depressed, a different action related to that application may be performed.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising:
    at least one processor and at least one memory including computer program code, the at least one memory and the computer program code configured to, with the processor, cause the apparatus to at least:
    receive an indication of a composite user input comprising:
        a) a sliding of a first user interface component from a first position to a second position, wherein the first user interface component comprises a slidable member slidably engaged with a device body and b) an additional user input comprising at least a touch input or selection of a second user interface component while the sliding of the first user interface component occurs, wherein the first user interface component is on a first surface of a first device and the second user interface component is on a second surface of the device opposite to the first surface; and
    cause performance of an operation relating to an application represented by the second user interface component, in response to the composite user input, wherein the operation differs from that of another operation performed in response to only one of the sliding of the first user interface component or the additional user input.

2. The apparatus of claim 1, wherein the at least one memory and the computer program code are further configured to:
    receive a subsequent indication of a user input action on the second user interface component, without an indication of a sliding of the first user interface component; and
    cause performance of a subsequent operation in response to the subsequent indication.

3. The apparatus of claim 1, wherein the at least one memory and the computer program code are further configured to:
    receive a subsequent indication of a sliding of the first user interface component, without an indication of an action on the second user interface component; and
    cause performance of a subsequent operation in response to the subsequent indication.

4. The apparatus of claim 1, wherein the indication further comprises an indication of a messaging application, and the operation comprises causing display of a text input screen within the messaging application.

5. The apparatus of claim 4, wherein the indication further comprises an indication of a contact, and the text input screen comprises a message recipient defaulted as the contact.

6. The apparatus of claim 1, wherein the device is a mobile telephone and the apparatus is configured to receive a signal as the indication of the composite user input.

7. The apparatus of claim 6, wherein the operation performed in response to the composite input is performed on the apparatus.

8. The apparatus of claim 6, wherein the operation performed in response to the composite input is performed on the device.

9. A method comprising:
receiving an indication of a composite user input comprising: a) a sliding of a first user interface component from a first position to a second position, wherein the first user interface component comprises a slidable member slidably engaged with a device body and b) an additional user input comprising at least a touch input or selection of a second user interface component while the sliding of the first user interface component occurs, wherein the first user interface component is on a first surface of a first device and the second user interface component is on a second surface of the device opposite to the first surface; and
with a processor, causing performance of an operation relating to an application represented by the second user interface component, in response to the composite user input, wherein the operation differs from that of another operation performed in response to only one of the sliding or the additional user input.

10. The method of claim 9, further comprising:
receiving a subsequent indication of a user input action on the second user interface component, without an indication of a sliding of the first user interface component; and
causing performance of a subsequent operation in response to the subsequent indication.

11. The method of claim 9, further comprising:
receiving a subsequent indication of a sliding of the first user interface component, without an indication of an action on the second user interface component; and
causing performance of a subsequent operation in response to the subsequent indication.

12. The method of claim 9, wherein the indication further comprises an indication of a messaging application, and the operation comprises causing display of a text input screen within the messaging application.

13. A computer program product comprising at least one non-transitory computer-readable storage medium having computer-executable program code instructions stored therein, the computer-executable program code instructions comprising program code instructions to:
receive an indication of a composite user input comprising: a) a sliding of a first user interface component from a first position to a second position, wherein the first user interface component comprises a slidable member slidably engaged with a device body and b) an additional user input comprising at least a touch input or selection of a second user interface component while the sliding of the first user interface component occurs, wherein the first user interface component is on a first surface of a first device and the second user interface component is on a second surface of the device opposite to the first surface; and
cause performance of an operation relating to an application represented by the second user interface component, in response to the composite user input, wherein the operation differs from that of another operation performed in response to only one of the sliding or the additional user input.

14. The computer program product of claim 13, wherein the computer-executable program code instructions further comprise program code instructions to:
receive a subsequent indication of a user input action on the second user interface component, without an indication of a sliding of the first user interface component; and
cause performance of a subsequent operation in response to the subsequent indication.

15. The computer program product of claim 13, wherein the computer-executable program code instructions further comprise program code instructions to:
receive a subsequent indication of a sliding of the first user interface component, without an indication of an action on the second user interface component; and
cause performance of a subsequent operation in response to the subsequent indication.

16. The computer program product of claim 13, wherein the indication further comprises an indication of a destination and a data item, and the operation comprises causing transmittal of the data item to the destination.

17. The computer program product of claim 13, wherein the indication further comprises an indication of a messaging application, and the operation comprises causing display of a text input screen within the messaging application.

* * * * *